United States Patent
Cheong et al.

(10) Patent No.: US 11,358,979 B2
(45) Date of Patent: Jun. 14, 2022

(54) METALLOCENE-SUPPORTED CATALYST AND METHOD FOR PREPARING POLYPROPYLENE USING THE SAME

(71) Applicant: LG Chem, Ltd., Seoul (KR)

(72) Inventors: Jae Youp Cheong, Daejeon (KR); Heon Yong Kwon, Daejeon (KR); Daesik Hong, Daejeon (KR); Sangjin Jeon, Daejeon (KR)

(73) Assignee: LG Chem, Ltd.

( * ) Notice: Subject to any disclaimer, the term of this patent is extended or adjusted under 35 U.S.C. 154(b) by 57 days.

(21) Appl. No.: 16/957,962

(22) PCT Filed: Dec. 21, 2018

(86) PCT No.: PCT/KR2018/016504
§ 371 (c)(1),
(2) Date: Jun. 25, 2020

(87) PCT Pub. No.: WO2019/132450
PCT Pub. Date: Jul. 4, 2019

(65) Prior Publication Data
US 2020/0369701 A1    Nov. 26, 2020

(30) Foreign Application Priority Data

Dec. 26, 2017 (KR) .................. 10-2017-0180268
Dec. 20, 2018 (KR) .................. 10-2018-0166737

(51) Int. Cl.
| | | |
|---|---|---|
| *C07F 17/00* | (2006.01) | |
| *C08F 4/6592* | (2006.01) | |
| *C08F 110/06* | (2006.01) | |
| *C08F 10/06* | (2006.01) | |
| *C08F 4/659* | (2006.01) | |

(52) U.S. Cl.
CPC .......... *C07F 17/00* (2013.01); *C08F 4/65916* (2013.01); *C08F 4/65927* (2013.01); *C08F 10/06* (2013.01); *C08F 110/06* (2013.01)

(58) Field of Classification Search
CPC .. C07F 17/00; C08F 4/65927; C08F 4/65916; C08F 110/06
See application file for complete search history.

(56) References Cited

U.S. PATENT DOCUMENTS

| | | |
|---|---|---|
| 5,032,562 A | 7/1991 | Lo et al. |
| 5,525,678 A | 6/1996 | Mink et al. |
| 5,914,289 A | 6/1999 | Razavi |
| 6,177,529 B1 | 1/2001 | Razavi et al. |
| 2003/0105253 A1 | 6/2003 | Diefenbach |
| 2005/0239979 A1 | 10/2005 | Schottek et al. |
| 2006/0116490 A1 | 6/2006 | Paczkowski et al. |
| 2010/0261860 A1 | 10/2010 | Schulte et al. |
| 2014/0316085 A1 | 10/2014 | Stewart et al. |
| 2016/0347894 A1 | 12/2016 | Endo et al. |
| 2017/0183432 A1 | 6/2017 | Endo et al. |

FOREIGN PATENT DOCUMENTS

| | | |
|---|---|---|
| EP | 3034521 A1 | 6/2016 |
| JP | 2001525458 A | 12/2001 |
| KR | 20040076965 A | 9/2004 |
| KR | 100615460 B1 | 8/2006 |
| KR | 20070012412 A | 1/2007 |
| KR | 20070092217 A | 9/2007 |
| KR | 20100101093 A | 9/2010 |
| KR | 101228582 B1 | 1/2013 |
| KR | 20160101062 A | 8/2016 |
| KR | 20160103042 A | 8/2016 |
| KR | 20170048012 A | 5/2017 |
| WO | 9616069 A1 | 5/1996 |
| WO | 2004076502 A1 | 9/2004 |
| WO | 2014169017 A1 | 10/2014 |

OTHER PUBLICATIONS

Extended European Search Report for Application No. EP18895226.1 dated Jan. 28, 2021, 5 pgs.
Han, et al., Aminosilylene-bridged ansa-zirconocenes for branched polyethylenes with bimodal molecular weight distributions, Journal of Organometallic Chemistry, Available online Sep. 6, 2009, pp. 4216-4222, vol. 694.
International Search Report for Application No. PCT/KR2018/016504, dated Apr. 5, 2019, pp. 1-2.
Liu, et al., Synthesis and Characterization of Substituted Poly(ferrocenylsilanes) and Magnetic Properties of Their Doped Products, Synthetic Metals, 2003, pp. 171-172, vol. 135-136.

*Primary Examiner* — Caixia Lu
(74) *Attorney, Agent, or Firm* — Lerner, David, Littenberg, Krumholz & Mentlik, LLP

(57) ABSTRACT

The present invention relates to a supported catalyst comprising a novel metallocene compound having excellent polymerization activity, and a method for producing polypropylene comprising polymerizing propylene in the presence of the catalyst. The supported metallocene-catalyst of the present invention can produce a polypropylene having a relatively narrow molecular weight distribution and a SPAN value.

9 Claims, No Drawings

METALLOCENE-SUPPORTED CATALYST AND METHOD FOR PREPARING POLYPROPYLENE USING THE SAME

CROSS-REFERENCE TO RELATED APPLICATION(S)

This application is a national phase entry under 35 U.S.C. § 371 of International Application No. PCT/KR2018/016504, filed Dec. 21, 2018, which claims the benefit of Korean Patent Application No. 10-2017-0180268, filed Dec. 26, 2017 and Korean Patent Application No. 10-2018-0166737, filed Dec. 20, 2018, the disclosures of which are herein incorporated by reference.

BACKGROUND OF THE INVENTION

(A) Field of the Invention

The present invention relates to a novel supported metallocene catalyst and a method for preparing a polypropylene using the same. According to the present invention, polypropylene having a relatively narrow molecular weight distribution and SPAN value can be produced with high activity by using a supported catalyst containing a single metallocene compound.

(b) Description of the Related Art

Olefin polymerization catalyst systems may be divided into Ziegler-Natta and metallocene catalysts, and these highly active catalyst systems have been developed in accordance with their characteristics. The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, depending on the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method of preparing a polymerization catalyst by supporting two different transition metal catalysts on one support. This catalyst is prepared by supporting a titanium (Ti)-based Ziegler-Natta catalyst which produces a high molecular weight polymer and a zirconium(Zr)-based metallocene catalyst which produces a low molecular weight polymer on one support, and results in a bimodal molecular weight distribution. This method is disadvantageous in that the supporting procedure is complicated and morphology of polymers is poor due to a cocatalyst.

U.S. Pat. No. 5,525,678 discloses a method of using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method of controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method of controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts depart from a supported component of the resulting catalyst to cause fouling in the reactor.

Accordingly, many studies have been conducted on metallocene catalysts for producing polypropylene having a narrow molecular weight distribution and a SPAN value while having a high activity in propylene polymerization reaction, but the extent of the studies is still insufficient.

SUMMARY OF THE INVENTION

Technical Problem

It is an object of the present invention to provide a supported metallocene catalyst comprising a new metallocene compound capable of producing polypropylene having a relatively narrow molecular weight distribution and SPAN value with high activity.

Technical Solution

According to one embodiment of the present invention, there can be provided a supported metallocene catalyst comprising a metallocene compound represented by the following Chemical Formula 1, and a support.

[Chemical Formula 1]

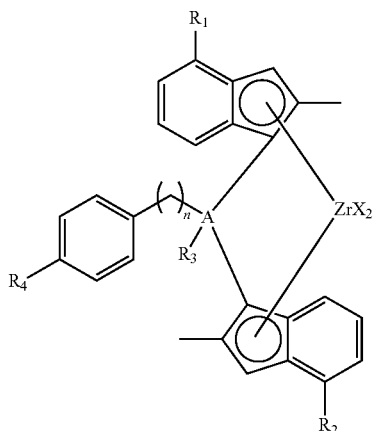

wherein, in Chemical Formula 1, n is an integer from 4 to 10, $R_1$ and $R_2$ are the same as or different from each other, and each independently, an aryl having 6 to 20 carbon atoms or an aryl having 6 to 20 carbon atoms substituted with an alkyl having 1 to 20 carbon atoms;

$R_3$ is an alkyl group having 1 to 20 carbon atoms;

$R_4$ is a tertiary amino having an alkyl group having 1 to 10 carbon atoms;

A is carbon, silicon or germanium; and each X is the same as or different from each other, and each independently, a halogen or an alkyl group having 1 to 20 carbon atoms.

For example, $R_4$ in Chemical Formula 1 may be dimethylamino, dipropylamino, diisopropylamino, diphenylamino, methylpropylamino, methylphenylamino, or isopropylphenylamino.

And, the compound represented by Chemical Formula 1 may be one of the compounds represented by the following structural formulas.

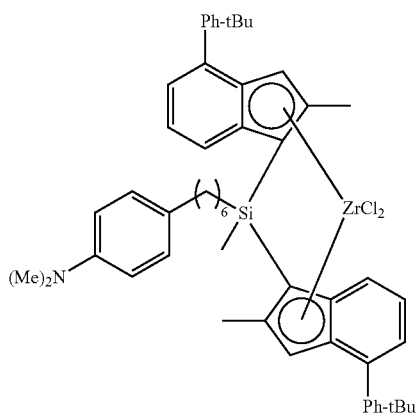

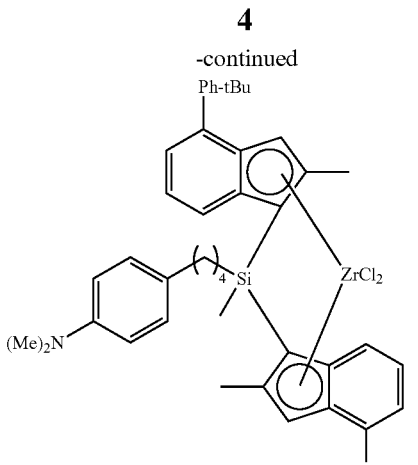

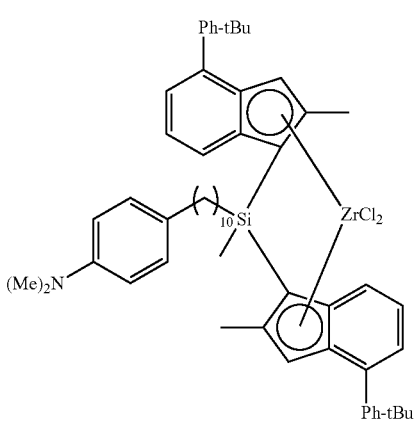

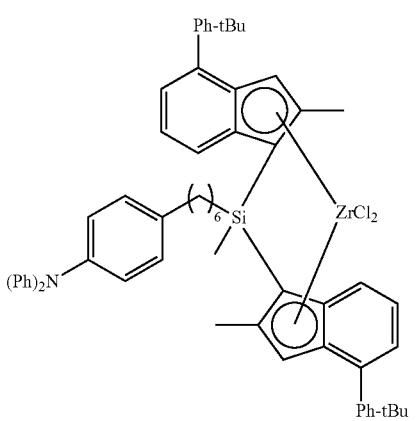

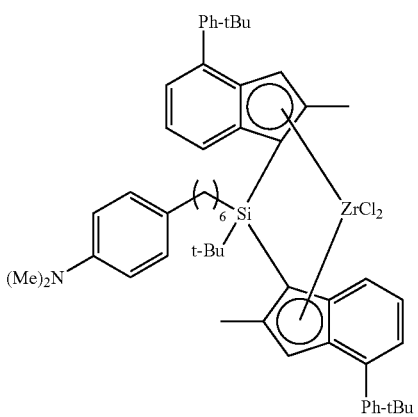

-continued

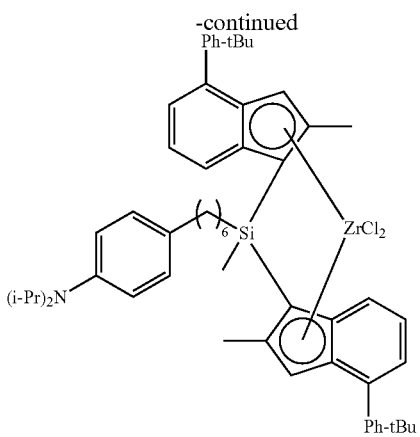

Further, the support may further include one or more cocatalyst compounds selected among the compounds represented by the following Chemical Formula 2, Chemical Formula 3, or Chemical Formula 4.

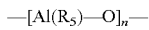 [Chemical Formula 2]

wherein, in Chemical Formula 2, each $R_5$ may be the same as or different from each other, and each independently, halogen; a hydrocarbon having 1 to 20 carbon atoms; or a hydrocarbon having 1 to 20 carbon atoms substituted with halogen; and n is an integer of 2 or more;

 [Chemical Formula 3]

wherein, in Chemical Formula 3, each $R_6$ may be the same as or different from each other, and each independently, halogen; a hydrocarbon having 1 to 20 carbon atoms; or a hydrocarbon having 1 to 20 carbon atoms substituted with halogen; and J is aluminum or boron;

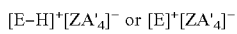 [Chemical Formula 4]

wherein in Chemical Formula 4,

E is a neutral or cationic Lewis acid;

H is a hydrogen atom;

Z is a Group 13 element; and each A' may be the same as or different from each other, and each independently an aryl group having 6 to 20 carbon atoms or an alkyl group having 1 to 20 carbon atoms, of which at least one hydrogen atom is unsubstituted or substituted with a halogen, a hydrocarbon having 1 to 20 carbon atoms, an alkoxy or a phenoxy.

And, the support may be one or more selected from the group consisting of silica, alumina, magnesia, and mixtures thereof.

In this case, a weight ratio of the transition metal included in the metallocene compound to the support may be about 1:10 to about 1:1,000.

Meanwhile, according to another embodiment of the present invention, there is provided a method for preparing a polypropylene comprising the step of polymerizing propylene in the presence of the above-mentioned supported metallocene catalyst.

The polymerization of propylene may be carried out by reacting at a temperature of about 25 to about 500° C. and a pressure of about 1 to about 100 kgf/cm² for about 1 to about 24 hours. At this time, it may be preferable to carry out the reaction in the presence of about 30 to about 2,000 ppm of hydrogen (H2) gas based on the weight of the propylene.

Advantageous Effects

The supported metallocene catalyst of the present invention can produce a polypropylene having a relatively narrow molecular weight distribution and SPAN value with high activity.

DETAILED DESCRIPTION OF THE EMBODIMENTS

The term "first", "second", etc. may be used herein to describe various elements, and the terms are only used to distinguish one element from another element.

Further, the terminology used herein is for the purpose of describing exemplary embodiments only and it is not intended to restrict the present invention. The singular forms are intended to include the plural forms as well, unless the context clearly indicates otherwise. The term "include", "comprise", or "have" is intended to specify the presence of stated features, integers, steps, elements, or combinations thereof, but does not preclude the presence or addition of one or more other features, integers, steps, elements, or combinations thereof.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

The present invention will be described in more detail below.

According to one embodiment of the present invention, there can be provided a supported metallocene catalyst comprising a metallocene compound represented by the following Chemical Formula 1, and a support.

[Chemical Formula 1]

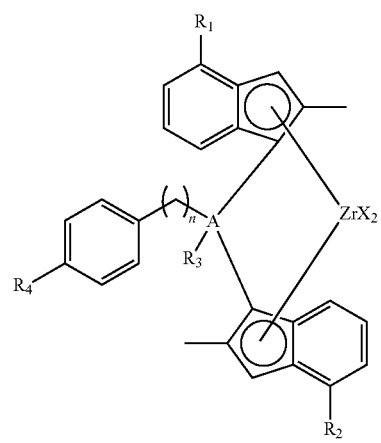

wherein, in Chemical Formula 1, n is an integer from 4 to 10, $R_1$ and $R_2$ are the same as or different from each other, and each independently, an aryl having 6 to 20 carbon atoms or an aryl having 6 to 20 carbon atoms substituted with an alkyl having 1 to 20 carbon atoms;

$R_3$ is an alkyl group having 1 to 20 carbon atoms;

$R_4$ is a tertiary amino having an alkyl group having 1 to 10 carbon atoms;

A is carbon, silicon or germanium; and

X is the same as or different from each other, and each independently, a halogen or an alkyl group having 1 to 20 carbon atoms.

For example, $R_4$ in Chemical Formula 1 may be dimethylamino, dipropylamino, diisopropylamino, diphenylamino, methylpropylamino, methylphenylamino, or isopropylphenylamino.

In addition, the compound represented by Chemical Formula 1 may be one of the compounds represented by the following structural formulas:

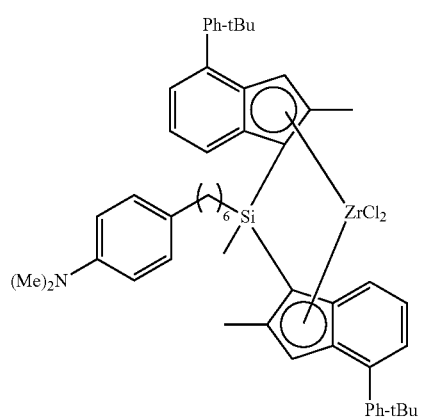

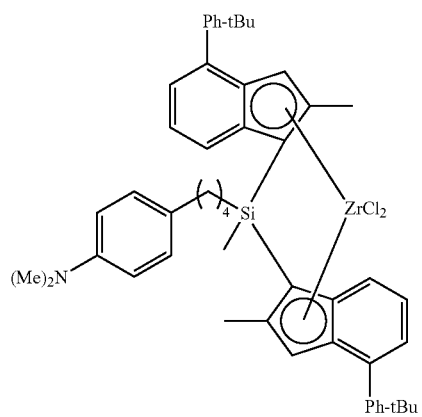

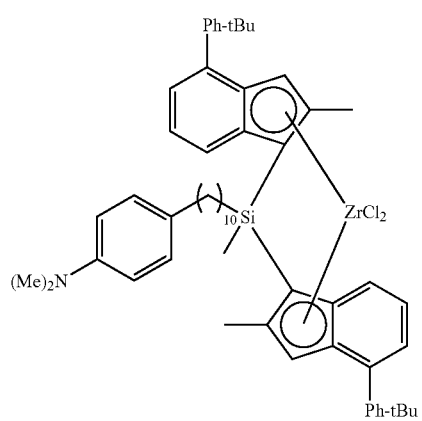

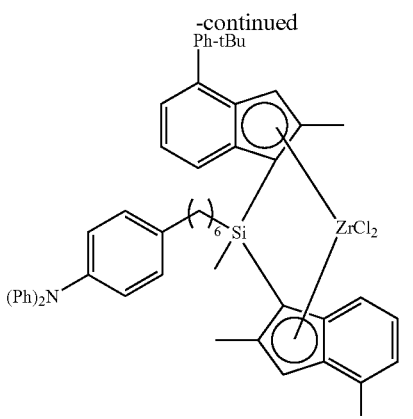

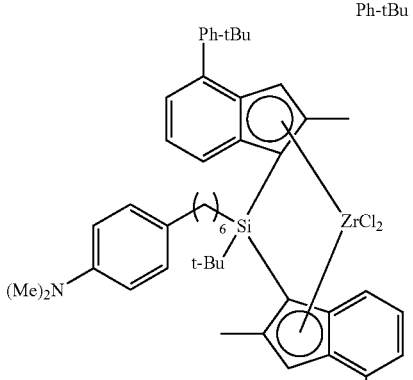

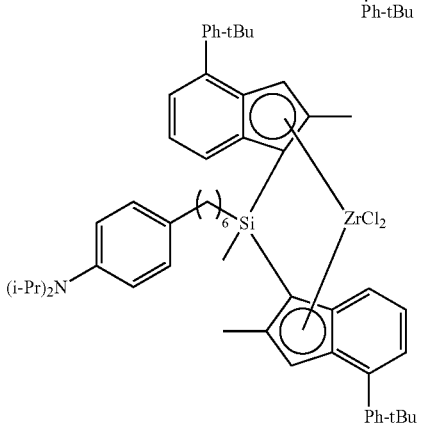

In general, a metallocene catalyst for polypropylene polymerization undergoes a supporting process in order to be applied to bulk polymerization, but the supporting process is troublesome, and when the supporting is not performed well, process problems (fouling, etc.) occur. The existing metallocene catalyst has a problem of undergoing a pre-polymerization process before the main polymerization in order to avoid process problems.

The present inventors have synthesized a new type of catalyst to which a tether of a specific structure capable of inducing a supporting reaction is bound, and confirmed that due to such a tether, the catalyst compound can be effectively supported on the support, thereby completing the present invention.

Particularly, the metallocene compound used for the supported catalyst according to one embodiment of the present invention can very large nucleophilicity by introducing an alkylene group of a certain length in a bridge group mutually connecting indenyl groups, and then connecting a phenyl group having a relatively high electron density and an amino group containing nitrogen.

Therefore, it can be more strongly bonded to the support than a conventional metallocene compound, and can have a relatively large number of single active species as compared with the conventional one, and thus, can exhibit uniform activity in the propylene polymerization reaction.

Consequently, the polypropylene prepared in the presence of a supported catalyst according to an example of the present invention can have uniform physical properties, such as having a relatively narrow molecular weight distribution and a narrow SPAN value, compared to the conventional one.

In the Chemical Formula 1, n is an alkylene group for connecting a tether from a bridge group connecting an indenyl group, and is an integer of 4 to 10, preferably about 5 to 8, more preferably 6.

By maintaining the alkylene link length as described above, electron delocalization can be maintained in the phenylene group and the amino group included in the tether group in the metallocene compound included in the supported catalyst of the present invention, and thereby, the bond between the metallocene compound and the support can be more strengthened, and the activity of the catalyst can be increased.

In addition, due to the effects of increasing the activity, the supported metallocene catalyst according to one aspect of the present invention can exhibit high catalytic efficiency in the propylene polymerization reaction even without adding a separate cocatalyst.

According to one embodiment of the present invention, the metallocene compound of the Chemical Formula 1 may be obtained by connecting an indene derivative with a bridge compound to prepare a ligand compound, and teen adding a metal precursor compound thereto to perform metallation, without being limited thereto.

More specifically, for example, the ligand compound is prepared by reacting an indene derivative with an organolithium compound such as n-Bu Li to produce a lithium salt, mixing the halogenated compound of the bridge compound, and then reacting the mixture. Until the reaction is completed by mixing the ligand compound or the lithium salt thereof and the metal precursor compound, the reaction is performed for about 12 hours to about 24 hours, and then the reaction product is filtered and dried under reduced pressure to obtain a metallocene compound represented by the Chemical Formula 1. The method for preparing the metallocene compound of the Chemical Formula 1 will be described in detail with reference to Examples described below.

As a support in the supported metallocene catalyst according to one embodiment, a support containing a hydroxyl group or a siloxane group on the surface may be used. Specifically, the support may be a support containing a hydroxy group or a siloxane group, which has high reactivity by drying at high temperature to remove moisture on the surface. More specifically, the support may be silica, alumina, magnesia or mixtures thereof. For example, the support may be one or more selected from the group consisting of silica, silica-alumina, and silica-magnesia. The support may be dried at a high temperature. Generally, the support may include oxide, carbonate, sulfate and nitrate components such as $Na_2O$, $K_2CO_3$, $BaSO_4$ and $Mg(NO_3)_2$.

An amount of hydroxy groups (—OH) on the surface of the support is preferably as small as possible, but it is practically difficult to eliminate all hydroxy groups. The amount of hydroxy groups may be controlled by the preparation method, the preparation conditions, the drying conditions (temperature, time, drying method, etc.), etc. of the support, and the amount is preferably 0.1 mmol/g to 10 mmol/g, more preferably 0.1 mmol/g to 1 mmol/g, and further preferably 0.1 mmol/g to 0.5 mmol/g. In order to reduce a side-reaction by a few hydroxy groups which remain after drying, a support, from which hydroxy groups are chemically eliminated while preserving highly reactive siloxane groups that participate in supporting, may be used.

In addition, one or more kinds of the compounds represented by the following Chemical Formula 2, Chemical Formula 3, or Chemical Formula 4 may be additionally supported as a cocatalyst on the support.

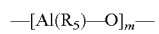  [Chemical Formula 2]

wherein, in Chemical Formula 2,
each $R_5$ may be the same as or different from each other, and each independently, halogen; a hydrocarbon having 1 to 20 carbon atoms; or a hydrocarbon having 1 to 20 carbon atoms substituted with halogen; and m is an integer of 2 or more;

  [Chemical Formula 3]

wherein, in Chemical Formula 3,
each $R_6$ may be the same as or different from each other, and each independently, halogen; a hydrocarbon having 1 to 20 carbon atoms; or a hydrocarbon having 1 to 20 carbon atoms substituted with halogen; and
J is aluminum or boron;

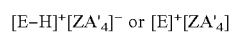  [Chemical Formula 4]

wherein in Chemical Formula 4,
E is a neutral or cationic Lewis acid;
H is a hydrogen atom;
Z is a Group 13 element; and
each A' may be the same as or different from each other, and each independently an aryl group having 6 to 20 carbon atoms or an alkyl group having 1 to 20 carbon atoms, of which at least one hydrogen atom is unsubstituted or substituted with a halogen, a hydrocarbon having 1 to 20 carbon atoms, an alkoxy or a phenoxy.

Non-limiting examples of the cocatalyst represented by the Chemical Formula 2 include methyl aluminoxane, ethyl aluminoxane, isobutyl aluminoxane, tert-butyl aluminoxane, or the like, and more preferred compounds include methyl aluminoxane.

Examples of the compound represented by the Chemical Formula 3 include trimethyl aluminum, triethyl aluminum, triisobutyl aluminum, tripropyl aluminum, tributyl aluminum, dimethylchloro aluminum, triisopropyl aluminum, tri-s-butyl aluminum, tricyclopentyl aluminum, tripentyl aluminum, triisopentyl aluminum, trihexyl aluminum, trioctyl aluminum, ethyl dimethyl aluminum, methyl diethyl aluminum, triphenylaluminum, tri-p-tolylaluminum, dimethyl aluminum methoxide, dimethyl aluminum ethoxide, trimethylboron, triethylboron, triisobutylboron, tripropyl boron, tributyl boron, and so on, and more preferred compounds are selected from trimethylaluminum, triethylaluminum, and triisobutylaluminum.

Examples of the compound represented by the Chemical Formula 4 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N, N-dimethylanilinium tetrakispentafluorophenylborate, diethylammonium tetrakispentafluorophenylborate, triphenylphosphonium tetraphenylborate, trimethylphosphonium tetraphenylborate, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o, p-dimethylphenyl)aluminum, tributylammonium tetra(p-trifluoromethylphenyl)aluminum, trimethylammonium tetra(p-trifluoromethylphenyl)aluminum, tributylammonium tetrakispentafluorophenylaluminum, N,N-diethylanilinium tetraphenylaluminum, N,N-diethylanilinium tetrakispentafluorophenyl aluminum, diethylammonium tetrakispentafluorophenylaluminum, triphenylphosphonium tetraphenylaluminum, trimethylphosphonium tetraphenylaluminum, tripropylammonium tetra(p-tolyl)borate, triethylammonium tetra(o, p-dimethylphenyl)borate, tributylammonium tetra(p-trifluoromethylphenyl)borate, triphenylcarbenium tetra(p-trifluoromethylphenyl)borate, triphenylcarbonium tetrakispentafluorophenylborate, and so one.

Preferably, alumoxane may be used as the cocatalyst, and more preferably, methylalumoxane (MAO), which is an alkyl alumoxane, may be used. Further, the cocatalyst can be used in an appropriate amount so that the activation of the metallocene compound as a catalyst precursor can be sufficiently proceeded.

The supported metallocene catalyst according to the present invention may be prepared by a first method including 1) contacting the metallocene compound represented by Chemical Formula 1 with the compound represented by Chemical Formula 2 or Chemical Formula 3 to obtain a mixture, and 2) adding the compound represented by Chemical Formula 4 to the mixture.

Furthermore, the supported metallocene catalyst according to the present invention may be prepared by a second method of contacting the metallocene compound represented by Chemical Formula 1 with the compound represented by Chemical Formula 2.

In the first method of preparing the supported catalyst, a molar ratio of the metallocene compound represented by Chemical Formula 1/the compound represented by Chemical Formula 2 or Chemical Formula 3 is preferably 1/5000 to 1/2, more preferably 1/1000 to 1/10, and most preferably 1/500 to 1/20. When the molar ratio of the metallocene compound represented by Chemical Formula 1/the compound represented by Chemical Formula 2 or Chemical Formula 3 exceeds 1/2, there is a problem that the alkylating agent is very small in quantity and the metal compound is not completely alkylated. When the molar ratio is less than 1/5,000, the alkylation of the metal compound is accomplished, but there is a problem that the alkylated metal compound is not completely activated due to a side reaction between the remaining excess alkylating agent and an activator of Chemical Formula 2 or Chemical Formula 3. Furthermore, a molar ratio of the metallocene compound represented by Chemical Formula 1 to the compound represented by Chemical Formula 4 is preferably 1/25 to 1, more preferably 1/10 to 1, and most preferably 1/5 to 1. When the molar ratio of the metallocene compound represented by Chemical Formula 1 to the compound represented by Chemical Formula 4 exceeds 1, there is a problem that the activity of the prepared supported catalyst is deteriorated because the activator is relatively small in quantity and the metal compound is not completely activated. When the molar ratio is less than 1/25, the activation of the metal compound is completely accomplished, but there is a problem that cost of the supported catalyst is not economical or purity of the polymer to be prepared is decreased due to remaining excess activator.

In the second method of preparing the supported catalyst, a molar ratio of the metallocene compound represented by Chemical Formula 1 to the compound represented by Chemical Formula 2 is preferably 1/10000 to 1/10, more preferably 1/5000 to 1/100, and most preferably 1/3000 to 1/500. When the molar ratio exceeds 1/10, there is a problem that the activity of the prepared supported catalyst is deteriorated because the activator is relatively small in quantity and the metal compound is not completely activated. When the molar ratio is less than 1/10000, the activation of the metal compound is completely accomplished, but there is a problem that cost of the supported catalyst is not economical or purity of the polymer to be prepared is decreased due to remaining excess activator.

As a reaction solvent used for preparing the supported catalyst, a hydrocarbon solvent such as pentane, hexane, heptane, etc., or an aromatic solvent such as benzene, toluene, etc. may be used.

Further, when the metallocene compound and the cocatalyst compound are used in the form of being supported on a support, the metallocene compound may be included in an amount of about 0.5 to about 20 parts by weight and the cocatalyst may be included in an amount of about 1 to about 1000 parts by weight, based on 100 parts by weight of the support. Preferably, the metallocene compound may be included in an amount of about 1 to about 15 parts by weight and the cocatalyst may be included in an amount of about 10 to about 500 parts by weight, based on 100 parts by weight of the support. Most preferably, the metallocene compound may be included in an amount of about 1 to about 100 parts by weight and the cocatalyst may be included in an amount of about 40 to about 150 parts by weight, based on 100 parts by weight of the support.

In the supported metallocene catalyst of the present invention, a weight ratio of the total transition metals included in the metallocene compound to the support may be 1:10 to 1:1000. When the support and the metallocene compound are included at the above weight ratio, an optimal shape may be obtained. Further, a weight ratio of the cocatalyst compound to the support may be 1:1 to 1:100. When the cocatalyst and the metallocene compound are included at the above weight ratio, activity and a microstructure of the polymer may be optimized.

The supported metallocene catalyst may, in addition to the above-described components, further include additives, auxiliary agents, and the like commonly that are employed in the technical field of the present invention.

Meanwhile, according to another embodiment of the invention, there is provided a method of preparing a polypropylene comprising the step of polymerizing propylene in the presence of the supported metallocene catalyst.

As described above, the supported metallocene catalyst can provide a polypropylene having a narrow molecular weight distribution with high catalytic activity by using a catalyst including a metallocene compound of Chemical Formula 1 containing an indene ligand having a specific substituent.

In the method for preparing polypropylene according to one embodiment of the present invention, the supported catalyst comprising the metallocene compound of Chemical Formula 1 has improved catalytic activity as compared with the conventional Ziegler-Natta catalyst or metallocene catalyst, and even if the supporting conditions of the metallocene compound, that is, the reaction temperature, the reaction time, type of silica, and the supporting amount of the metallocene compound are changed, polypropylene can be produced with improved activity.

Here, the polymerization of the propylene monomer may be carried out at a temperature of about 25° C. to about 500° C. and a pressure of about 1 kgf/cm$^2$ to about 100 kgf/cm$^2$ for about 1 to about 24 hours. At this time, the polymerization reaction temperature is preferably about 25° C. to about 200° C., and more preferably about 50° C. to about 100° C. Furthermore, the polymerization reaction pressure may be about 1 to about 70 kgf/cm$^2$, and more preferably about 5 to about 50 kgf/cm$^2$. The polymerization reaction time is preferably about 1 to about 5 hours.

The method for preparing polypropylene of the present invention can be carried out by contacting propylene with the catalyst including a metallocene compound represented by Chemical Formula 1.

Furthermore, according to one embodiment of the present invention, the polymerization of propylene may be carried out in the presence of hydrogen gas.

At this time, the hydrogen gas serves to activate inactive sites of the metallocene catalyst and control the molecular weight of the polymer by causing a chain transfer reaction. The metallocene compound of the present invention is superior in hydrogen reactivity, and thus, the polypropylene having the required level of molecular weight and melt index can be effectively obtained by controlling the amount of the hydrogen gas used in the polymerization process.

The hydrogen gas used may be added in an amount of about 30 to about 2,000 ppm, or about 50 to about 1,500 ppm, or about 50 to about 500 ppm based on the total weight of propylene. The molecular weight distribution and the melt index (MI) of the prepared polypropylene can be controlled in the required range with showing sufficient catalytic activity by controlling the amount of the hydrogen gas used, and thus it is possible to prepare the polypropylene having a proper property according to the use. More specifically, since the metallocene catalyst of the present invention has very excellent hydrogen reactivity, the chain transfer reaction is activated by increasing the amount of hydrogen gas used and thereby, the polypropylene having decreased molecular weight and high melt index can be obtained.

The preparation method of a polypropylene may be carried out according to a solution polymerization process, a slurry process, or a gas phase process by using a continuous slurry polymerization reactor, a loop slurry reactor, a gas phase reactor, a solution reactor or the like.

In the preparation method of a polypropylene according to the present invention, the catalyst may be injected into a reactor after dissolving or diluting the same in a C5-12 aliphatic hydrocarbon solvent, for example, pentane, hexane, heptane, nonane, decane, and an isomer thereof; an aromatic hydrocarbon solvent such as toluene and benzene; and a chlorinated hydrocarbon solvent such as dichloromethane and chlorobenzene. Here, it is preferable to use the solvent after eliminating a little water or air that acts as a catalytic poison therefrom by treating the same with a small quantity of alkylaluminum.

The preparation method of a polypropylene may further include steps usually employed in the technical field of the present invention, in addition to the above-mentioned steps.

Meanwhile, according to another embodiment of the present invention, a polypropylene obtained by the preparation method is provided.

As disclosed above, according to the present invention, by using the catalyst including said novel metallocene compound, the polypropylene having excellent processability and high polymerization activity without fouling can be obtained, as compared with the polymer prepared by using an existing metallocene compound.

The polypropylene has low processing temperature and is superior in transparency and fluidity, and thus it can be used to packaging containers, films, sheets, injection molded parts, fiber products, and so on that requires such characteristics.

According to one embodiment of the present invention, when the polymerization process of propylene is carried out by using the catalyst including the metallocene compound, the weight average molecular weight (Mw) of the prepared polypropylene may depend the amount of hydrogen gas introduced during the polymerization process, but it may be about 50,000 to about 1,000,000 g/mol, or about 80,000 to about 500,000 g/mol, preferably about 100,000 to about 300,000 g/mol, Furthermore, the polypropylene prepared according to the present invention can have a relatively narrow molecular weight distribution and SPAN value. For example, the polypropylene produced according to one embodiment of the present invention may have a molecular weight distribution value measured by GPC of about 3 or less, preferably about 2.6 or less, and a SPAN value measured by an optical diffraction particle size analyzer of about 1 or less, preferably about 0.9 or less, and more preferably about 0.7 to about 0.8. The SPAN value means the width of particle size distribution, and the polypropylene has a characteristic that the SPAN value is small and thus, the particle size is uniform, which makes it possible to produce a product having high transparency and particularly less problems of taste or odor peculiar to polypropylene.

Furthermore, the polypropylene prepared according to one embodiment of the present invention may have a very uniform characteristic due to the above characteristics, for example, it may have a melt index (MI) of about 1 to about 10 g/10 min, preferably about 1 to about 7 g/10 min when measured at 230° C. with the load of 2.16 kg. In particular, since these physical properties can be easily adjusted according to the amount of hydrogen used during the polymerization process, it is possible to produce polypropylene having an appropriate molecular weight, molecular weight distribution and melt property depending on the use.

Hereinafter, the action and effect of the present invention are described in more detail with reference to concrete examples. However, the following examples are provided for illustrative purposes only and the present disclosure is not intended to be limited by these examples.

EXAMPLE

Preparation of Metallocene Compound

Preparation Example 1

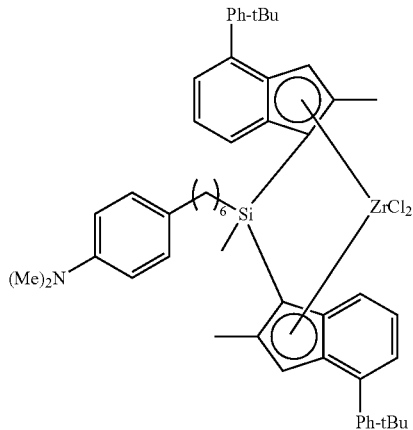

Step 1-1: Synthesis of 4-(6-(dichloro(methyl)silyl)hexyl)-N,N-dimethylaniline In a flask, 4-(6-bromohexyl)-N,N-dimethylaniline (5.00 g, 25 mmol) and Mg (1.22 g, 50.2 mmol) were added to THF (25 mL), and the mixture was stirred at 70° C. for 4 hours. In another flask, MeSiCl$_3$ (7.47 g, 50.0 mmol) was dissolved in THF (75 mL), and then the mixture was slowly added dropwise at 0° C. for 1 hour. Then, the mixture was stirred overnight at room temperature and then, sat. NaHCO$_3$ was added. Water was removed with anhydrous MgSO$_4$, and the obtained solution was concentrated under reduced pressure to obtain 4-(6-(dichloro(methyl)silyl)hexyl)-N,N-dimethylaniline (4.80 g, 82%) as a white solid.

$^1$H NMR (500 MHz, CDCl$_3$, 7.24 ppm): 0.99 (3H, s), 3.01 (6H, s), 6.75 (2H, d), 7.57 (2H, d)

Step 1-2: Synthesis of 4-(6-(bis(4-(4-(tert-butyl)phenyl)-2-methyl-1H-inden-1-yl)(methyl)silyl)hexyl)-N,N-dimethylaniline 4-(4-(Tert-butyl)phenyl)-2-methyl-1H-indene (10.3 g, 39.3 mmol) and CuCN (176 mg, 1.97 mmol) were dissolved in toluene (90 mL) and THF (12 mL) under argon(Ar). This solution was cooled to −30° C., n-BuLi (2.5 M in hexane, 16.5 mL) was slowly added. After stirring at this temperature for about 10 minutes and raising the temperature to room temperature, the mixture was stirred for 2 hours. To this solution, the obtained 4-(6-(dichloro(methyl)silyl)hexyl)-N,N-dimethylaniline (4.80 g, 20.5 mmol) in toluene (30 mL) was added and then stirred overnight at room temperature. After the reaction was completed, MTBE and water were added and the organic layer was separated. The obtained organic layer was dried with anhydrous MgSO$_4$ and concentrated to obtain 4-(6-(bis(4-(4-(tert-butyl)phenyl)-2-methyl-1H-inden-1-yl)(methyl)silyl)hexyl)-N,N-dimethylaniline (13.8 g, 100%) as a white solid.

$^1$H NMR (500 MHz, CDCl$_3$, 7.24 ppm): 0.00-0.07 (3H, m), 1.49-1.52 (18H, m), 2.46-2.49 (6H, m), 3.00 (3H, s), 3.02 (3H, s), 4.23-4.39 (2H, m), 6.50-7.52 (20H, m)

Step 1-3: Synthesis of [4-(6-(bis(4-(4-(tert-butyl)phenyl)-2-methyl-inden-1-yl)(methyl)silyl)hexyl)-N,N-dimethylaniline] zirconium dichloride 4-(6-(bis(4-(4-(tert-butyl)phenyl)-2-methyl-1H-inden-1-yl)(methyl)silyl)hexyl)-N,N-dimethylaniline (6.74 g, 9.83 mmol) was added to a 50 mL-Schlenk flask under argon(Ar), and diethyl ether (8.2 mL) was added and dissolved. The temperature was lowered to −78° C., n-BuLi (2.5 M in hexane, 8.1 mL) was added and then stirred at room temperature for 2 hours. ZrCl$_4$ (2.29 g, 9.83 mmol) in Tol/diethyl ether (24.6/8.2 mL) slurry was slowly added to a ligand solution at −78° C., the temperature was raised to room temperature and the mixture was stirred overnight. The solvent was distilled under reduced pressure, dissolved in CH$_2$Cl$_2$, and filtered to remove LiCl. The filtrate was concentrated, a crude produced was saturated with CH$_2$Cl$_2$, and hexane was added by twice the volume, and then recrystallized at −20° C. for 15 hours. Thereafter, when a yellow solid was formed, it was filtered and then washed twice with hexane to obtain [4-(6-(bis(4-(4-(tert-butyl)phenyl)-2-methyl-inden-1-yl)(methyl)silyl)hexyl)-N,N-dimethylaniline] zirconium dichloride (225 mg, 30%, r/m>20/1).

$^1$H NMR (500 MHz, CDCl$_3$, 7.24 ppm): 1.30-1.40 (21H, m), 2.00 (3H, s), 2.33 (3H, s), 3.10 (6H, s), 6.85-7.94 (18H, m)

Preparation of a Supported Catalyst

Example 1

After supporting methyl aluminoxane on silica by the following method, the metallocene compound obtained in step 1-3 was supported to produce a supported catalyst.

First, silica (3 g) was added to a 250 mL Schlenk flask under argon, to which methyl aluminoxane (MAO, 19 mL, 8 mmol) was slowly added at room temperature, and the mixture was stirred at 90° C. for 18 hours. After the reaction was completed, the mixture was cooled to room temperature and allowed to stand for 15 minutes, and then the solvent of the upper layer was removed. Toluene (25 mL) was added, the mixture was stirred for 3 minutes, allowed to stand for 10 minutes, and then the solvent of the upper layer was removed. The metallocene compound (70 μmol) obtained in the step 1-3 was dissolved in toluene (20 mL), and then added to a flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, allowing to stand for 10 minutes and removing the solvent of the upper layer was performed once. As another cocatalyst, N,N-dimethylanilinium tetrakispentafluorophenylborate (135 mg) was dissolved in toluene (20 mL), and then added to the flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, and allowing to stand for 10 minutes, removing the solvent of the upper layer was performed once. In the same manner, hexane (25 mL) was added, stirred for 1 minute, allowed to stand for 20 minutes, and then the solvent of the upper layer was removed, and dried overnight. It was further vacuum dried at 45° C. for 4 hours.

Example 2

After supporting methyl aluminoxane on silica by the following method, the metallocene compound obtained in step 1-3 was supported to produce a supported catalyst.

First, silica (3 g) was added to a 250 mL Schlenk flask under argon, to which methyl aluminoxane (MAO, 19 mL, 8 mmol) was slowly added at room temperature, and the mixture was stirred at 90° C. for 18 hours. After the reaction was completed, the mixture was cooled to room temperature and allowed to stand for 15 minutes, and then the solvent of the upper layer was removed. Toluene (25 mL) was added, the mixture was stirred for 3 minutes, allowed to stand for 10 minutes, and then the solvent of the upper layer was removed. The metallocene compound (70 μmol) obtained in the step 1-3 was dissolved in toluene (20 mL), and then added to a flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, allowing to stand for 10 minutes and removing the solvent of the upper layer was performed once. In the same manner, hexane (25 mL) was added, stirred for 1 minute, allowed to stand for 20 minutes, and then the solvent of the upper layer was removed, and dried overnight. It was further vacuum dried at 45° C. for 4 hours.

Preparation of Metallocene Compound

Comparative Preparation Example

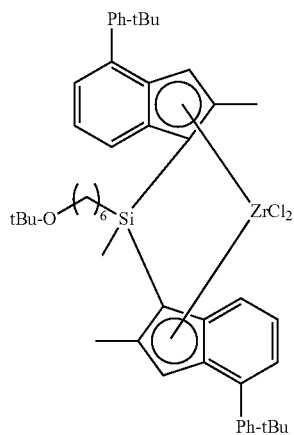

Step 2-1: Synthesis of (6-(tert-butoxy)hexyl)bis(4-(4-(tert-butyl)phenyl)-2-methyl-1H-inden-1-yl)(methyl)silane 4-(4-(Tert-butyl)phenyl)-2-methyl-1H-indene (10.3 g, 39.3 mmol) and CuCN (176 mg, 1.97 mmol) were dissolved in toluene (90 mL) and THF (12 mL) under argon (Ar). This solution was cooled to −30° C., n-BuLi (2.5 M in hexane, 16.5 mL) was slowly added. After stirring at this temperature for about 10 minutes and raising the temperature to room temperature, the mixture was stirred for 2 hours. To this solution, the obtained (6-(tert-butoxy)hexyl)dichloro(methyl)silane (5.56 g, 20.5 mmol) in toluene (30 mL) was added and then stirred overnight at room temperature. After the reaction was completed, MTBE and water were added and the organic layer was separated. The obtained organic layer was dried with anhydrous MgSO$_4$ and concentrated to obtain (6-(tert-butoxy)hexyl)bis(4-(4-(tert-butyl)phenyl)-2-methyl-1H-inden-1-yl)(methyl)silane (14.8 g, 100%) as a pale yellow oil.

$^1$H NMR (500 MHz, CDCl$_3$, 7.24 ppm): −0.10-0.91 (3H, m), 1.25-1.40 (27H, m), 1.92-2.38 (6H, m), 4.11-4.52 (4H, m), 6.44-7.91 (20H, m)

Step 2-2: Synthesis of [(6-(tert-butoxy)hexyl)bis(4-(4-(tert-butyl)phenyl)-2-methyl-inden-1-yl)(methyl)silane] zirconium dichloride (6-(Tert-butoxy)hexyl)bis(4-(4-(tert-butyl)phenyl)-2-methyl-1H-inden-1-yl)(methyl)silane (1.0 g, 1.37 mmol) was added to a 50 mL-Schlenk flask under argon(Ar), and diethyl ether (10 mL) was added and dissolved. The temperature was lowered to −78° C., n-BuLi (2.5 M in hexane, 1.1 mL) was added and then stirred at room temperature for 2 hours. The solvent was distilled under reduced pressure in vacuum, ZrCl4(THF)2 (517 mg, 1.37 mmol) was added to a glove box, and the temperature was lowered to −78° C. Toluene (10 mL) was added to the mixture, and then the temperature was raised to room temperature and the mixture was stirred overnight. The solvent was distilled under reduced pressure and washed with hexane to obtain a yellow solid. This solid was dissolved in toluene and filtered through syringe filter. The filtrate was distilled under reduced pressure, and the solid was washed with hexane to obtain a yellow [(6-(tert-butoxy)hexyl)bis(4-(4-(tert-butyl)phenyl)-2-methyl-inden-1-yl)(methyl)silane] Zirconium dichloride (225 mg, 18%, r/m>10/1).

$^1$H NMR (500 MHz, CDCl$_3$, 7.24 ppm): 1.33-1.34 (21H, m), 1.37 (9H, s), 1.96 (3H, s), 2.33 (3H, s), 4.59 (2H, s), 6.86 (1H, t), 7.02 (1H, s), 7.06 (1H, s), 7.17 (2H, m), 7.33 (1H, d), 7.41-7.47 (5H, m), 7.55-7.62 (6H, m), 7.73 (1H, s), 8.06 (2H, d)

Preparation of a Supported Catalyst

Comparative Example 1

After supporting methyl aluminoxane on silica by the following method, the metallocene compound obtained in step 2-2 was supported to produce a supported catalyst.

First, silica (3 g) was added to a 250 mL Schlenk flask under argon, to which methyl aluminoxane (MAO, 19 mL, 8 mmol) was slowly added at room temperature, and the mixture was stirred at 90° C. for 18 hours. After the reaction was completed, the mixture was cooled to room temperature and allowed to stand for 15 minutes, and then the solvent of the upper layer was removed. Toluene (25 mL) was added, the mixture was stirred for 3 minutes, allowed to stand for 10 minutes, and then the solvent of the upper layer was removed. The metallocene compound (70 μmol) obtained in the step 2-2 was dissolved in toluene (20 mL), and then added to a flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, allowing to stand for 10 minutes and removing the solvent of the upper layer was performed once. As another cocatalyst, dimethylanilinium tetrakispentafluorophenylborate (135 mg) was dissolved in toluene (20 mL), and then added to the flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, and allowing to stand for 10 minutes, removing the solvent of the upper layer was performed once. In the same manner, hexane (25 mL) was added, stirred for 1 minute, allowed to stand for 20 minutes, and then the solvent of the upper layer was removed, and dried overnight. It was further vacuum dried at 45° C. for 4 hours.

Comparative Example 2

After supporting methyl aluminoxane on silica by the following method, the metallocene compound obtained in step 2-2 was supported to produce a supported catalyst.

First, silica (3 g) was added to a 250 mL Schlenk flask under argon, to which methyl aluminoxane (MAO, 19 mL, 8 mmol) was slowly added at room temperature, and the mixture was stirred at 90° C. for 18 hours. After the reaction was completed, the mixture was cooled to room temperature and allowed to stand for 15 minutes, and then the solvent of the upper layer was removed. Toluene (25 mL) was added, the mixture was stirred for 3 minutes, allowed to stand for 10 minutes, and then the solvent of the upper layer was removed. The metallocene compound (70 μmol) obtained in the step 2-2 was dissolved in toluene (20 mL), and then added to a flask using a cannula and washed with toluene (5 mL). After stirring at 50° C. for 5 hours, the mixture was cooled to room temperature and allowed to stand for 15 minutes, and then the solvent of the upper layer was removed. The process of adding toluene (25 mL), stirring for 3 minutes, allowing to stand for 10 minutes and removing the solvent of the upper layer was performed once. In the same manner, hexane (25 mL) was added, stirred for 1 minute, allowed to stand for 20 minutes, and then the solvent of the upper layer was removed, and dried overnight. It was further vacuum dried at 45° C. for 4 hours.

Experimental Example

1) Homo-Polymerization of Propylene

After vacuum drying a 2 L stainless reactor at 65° C. and cooling the same, 3.0 mmol of triethylaluminum, 337 ppm of hydrogen (relative to propylene), and 770 g of propylene were sequentially added thereto at room temperature.

After stirring the mixture for 10 minutes, 0.030 g of each of the metallocene catalysts prepared in Example 1 and Comparative Examples 1 and 2 was dissolved in 20 mL of TMA-prescribed hexane and the solution was added to the reactor by nitrogen pressure. And then, after slowly elevating the temperature of the reactor to 70° C., the polymerization was carried out for 1 hour under the conditions of a hydrogen input of 337 ppm and a pressure of 35 kg/cm$^2$. After the reaction was terminated, unreacted propylene was vented out.

2) Measuring Method of Physical Properties of Polymer (1) Catalytic activity: the ratio of the weight of the produced polymer (kg PP) to the amount of the catalyst used (mmol and g of catalyst) was calculated, based on unit time (h).

(2) Melt Index (MI 2.16 kg): It was measured at 230° C. under a load of 2.16 kg according to ASTM D1238 and represented by the weight (g) of the polymer that was melted and discharged for 10 minutes.

(3) Molecular weight distribution: The molecular weight distribution value of the prepared polypropylene was measured using GPC.

(4) SPAN value: Using a light diffraction particle size analyzer (HELOS from Symatec), a sample was injected into a hopper, and a method in the range of 50~3500 um was set to confirm the APS (Average Particle Size) and SPAN value.

The reaction conditions of the Examples and Comparative Examples and the physical properties of the produced polypropylene are summarized in Table 1 below.

TABLE 1

|  | Unit | Example 1 | Example 2 | Comparative Example 1 | Comparative Example 2 |
|---|---|---|---|---|---|
| Silica |  | SP2410 | | | |
| Amount of catalyst | μmol | 70 | 70 | 70 | 70 |
| Amount of cocatalyst | mmol | 8 | 8 | 8 | 8 |
| Hydrogen | ppm | 331 | 331 | 331 | 331 |
| Yield | g | 390 | 360 | 360 | 270 |
| AB | eq. | 0 | 0.8 | 0.8 | 0 |
| Activity | kg PP/g Cat · hr | 13 | 12 | 12 | 9 |
| BD | g/cm$^3$ | 0.39 | 0.38 | 0.38 | 0.38 |
| MI | — | 3.4 | 5.1 | 9 | 8.1 |
| MWD | — | 2.57 | 2.54 | 2.88 | 2.9 |
| SPAN | — | 0.71 | 0.75 | 0.95 | 0.87 |

*Conditions: C3(770 g), Temperature (70° C.), polymerization time (1 hr)

*AB: N,N-dimethylanilinium tetrakispentafluorophenylborate,

*BD: Bulk Density

As shown in Table 1 in the case of Examples using the metallocene compound according to the present invention as a supported catalyst, it was confirmed that a high activity-enhancing effect was exhibited during the production of polypropylene, and in particular, the activity was not significantly changed even if an aluminum borate-based cocatalyst was not separately used.

In addition, it was confirmed that Example 1 could prepare a uniform polypropylene having a very low MI value while having a relatively narrow molecular weight distribution value and SPAN value, even if compared with Comparative Example 1 in which another tether group was introduced.

What is claimed is:

1. A supported metallocene catalyst comprising:
   a metallocene compound represented by the following Chemical Formula 1, and
   a support

[Chemical Formula 1]

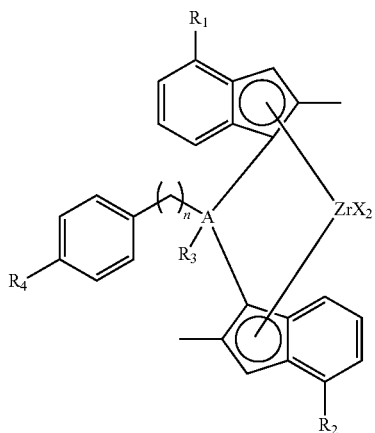

wherein, in Chemical Formula 1, n is an integer from 4 to 10, $R_1$ and $R_2$ are the same as or different from each other, and each independently, an aryl having 6 to 20 carbon atoms or an aryl having 6 to 20 carbon atoms substituted with an alkyl having 1 to 20 carbon atoms;

$R_3$ is an alkyl group having 1 to 20 carbon atoms;

$R_4$ is a tertiary amino having an alkyl group having 1 to 10 carbon atoms;

A is carbon, silicon or germanium; and each X is the same as or different from each other, and each independently, a halogen or an alkyl group having 1 to 20 carbon atoms.

2. The supported metallocene catalyst of claim 1, wherein the $R_4$ in Chemical Formula 1 is dimethylamino, dipropylamino, diisopropylamino, diphenylamino, methylpropylamino, methylphenylamino, or isopropylphenylamino.

3. The supported metallocene catalyst of claim 1, wherein the compound represented by Chemical Formula 1 is one of the compounds represented by the following structural formulas:

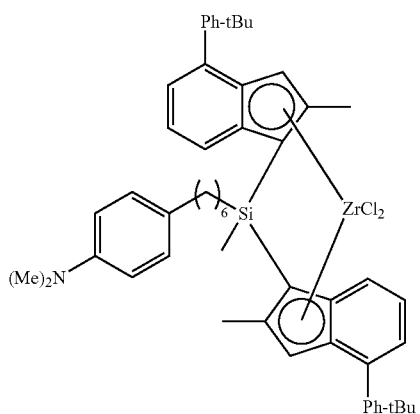

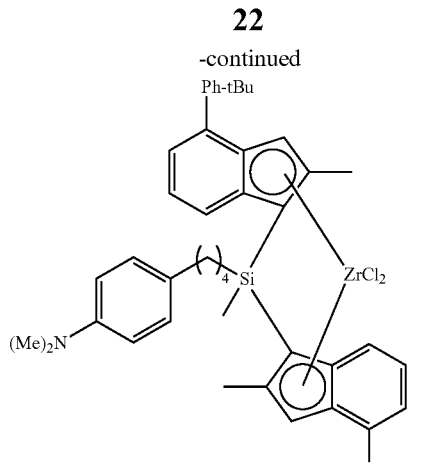

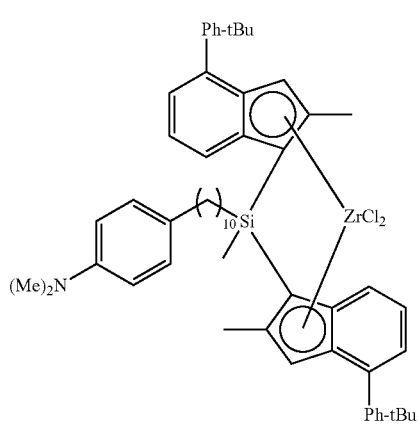

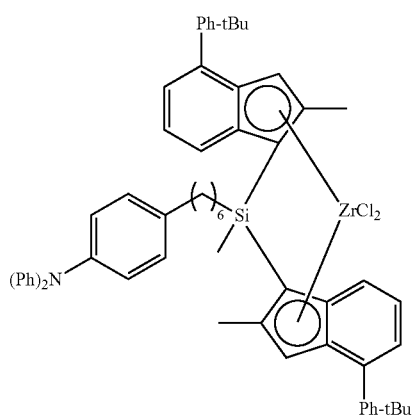

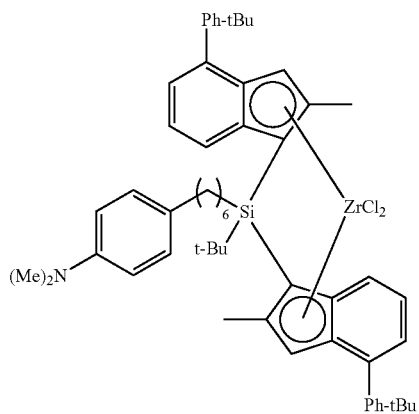

-continued

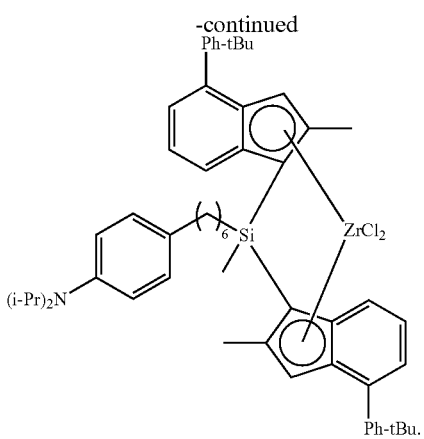

4. The supported metallocene catalyst of claim 1, further comprising one or more cocatalyst compounds selected among the compounds represented by the following Chemical Formula 2, Chemical Formula 3, or Chemical Formula 4:

—[Al($R_5$)—O]$_m$—      [Chemical Formula 2]

wherein, in Chemical Formula 2,
each $R_5$ is the same as or different from each other, and each independently, halogen; a hydrocarbon having 1 to 20 carbon atoms; or a hydrocarbon having 1 to 20 carbon atoms substituted with halogen; and
m is an integer of 2 or more;

J($R_6$)$_3$      [Chemical Formula 3]

wherein, in Chemical Formula 3,
each $R_6$ is the same as or different from each other, and each independently, halogen; a hydrocarbon having 1 to 20 carbon atoms; or a hydrocarbon having 1 to 20 carbon atoms substituted with halogen; and
J is aluminum or boron;

[E–H]$^+$[ZA'$_4$]$^-$ or [E]$^+$[ZA'$_4$]$^-$      [Chemical Formula 4]

wherein in Chemical Formula 4,
E is a neutral or cationic Lewis acid;
H is a hydrogen atom;
Z is a Group 13 element; and
each A' is the same as or different from each other, and each independently an aryl group having 6 to 20 carbon atoms or an alkyl group having 1 to 20 carbon atoms, of which at least one hydrogen atom is unsubstituted or substituted with a halogen, a hydrocarbon having 1 to 20 carbon atoms, an alkoxy or a phenoxy.

5. The supported metallocene catalyst of claim 1, wherein the support is one or more selected from the group consisting of silica, alumina, magnesia, and mixtures thereof.

6. The supported metallocene catalyst of claim 1, wherein a weight ratio of the transition metal of the metallocene compound to the support is 1:10 to 1:1,000.

7. A method for preparing a polypropylene comprising polymerizing propylene in the presence of the supported metallocene catalyst of claim 1.

8. The method for preparing a polypropylene of claim 7, wherein the polymerization of propylene is carried out by reacting at a temperature of 25° C. to 500° C. and a pressure of 1 kgf/cm² to 100 kgf/cm² for 1 hour to 24 hours.

9. The method for preparing a polypropylene of claim 7, wherein the reaction is carried out in the presence of 30 ppm to 2,000 ppm of hydrogen (H$_2$) gas based on the weight of the propylene.

* * * * *